(12) United States Patent
Winstead

(10) Patent No.: US 8,136,504 B2
(45) Date of Patent: Mar. 20, 2012

(54) HCCI HEAVY MIXING MODE

(75) Inventor: Vincent J. Winstead, Mankato, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 857 days.

(21) Appl. No.: 11/829,292

(22) Filed: Jul. 27, 2007

(65) Prior Publication Data
US 2009/0025679 A1    Jan. 29, 2009

(51) Int. Cl.
*F02B 5/00* (2006.01)

(52) U.S. Cl. .................................................. 123/305

(58) Field of Classification Search .......... 701/102–104, 701/107, 111, 114; 123/435, 436, 494; 60/600, 60/612; *F02B 5/00*
See application file for complete search history.

(56) References Cited

U.S. PATENT DOCUMENTS

| | | | |
|---|---|---|---|
| 4,452,518 A | 6/1984 | Di Gianfilippo et al. | |
| 6,276,334 B1 * | 8/2001 | Flynn et al. | 123/435 |
| 6,305,364 B1 | 10/2001 | Ma | |
| 6,305,805 B1 | 10/2001 | Liebenow | |
| 6,619,254 B2 | 9/2003 | Chmela et al. | |
| 6,640,754 B1 | 11/2003 | Iida | |
| 6,807,937 B2 | 10/2004 | Gianolio et al. | |
| 6,947,830 B1 * | 9/2005 | Froloff et al. | 701/111 |
| 7,051,700 B2 | 5/2006 | Kuzuyama et al. | |
| 2002/0036694 A1 | 3/2002 | Merril | |
| 2007/0239345 A1 * | 10/2007 | Bizub | 701/114 |

OTHER PUBLICATIONS

Lang, O., W. Salber, J.Hahn, S. Pischinger, K. Hortmann & C. Bucker, "Thermodynamical and Mechanical Approach Towards a Variable Valve Train for the Controlled Auto Ignition Combustion Process," SAE Technical Paper Series, Apr. 11-14, 2005, 2005-01-0762.

* cited by examiner

*Primary Examiner* — Noah Kamen
*Assistant Examiner* — Keith Coleman
(74) *Attorney, Agent, or Firm* — Allan J. Lippa; Alleman Hall McCoy Russell & Tuttle LLP

(57) ABSTRACT

A method for operating a multi-stroke homogeneous charge compression ignition engine is described. The method includes late intake valve opening (LIVO) and also cycling air and fuel charge from the cylinder back into the intake manifold during a compression stroke to mix the air and fuel charge for later reintroduction and combustion.

18 Claims, 7 Drawing Sheets

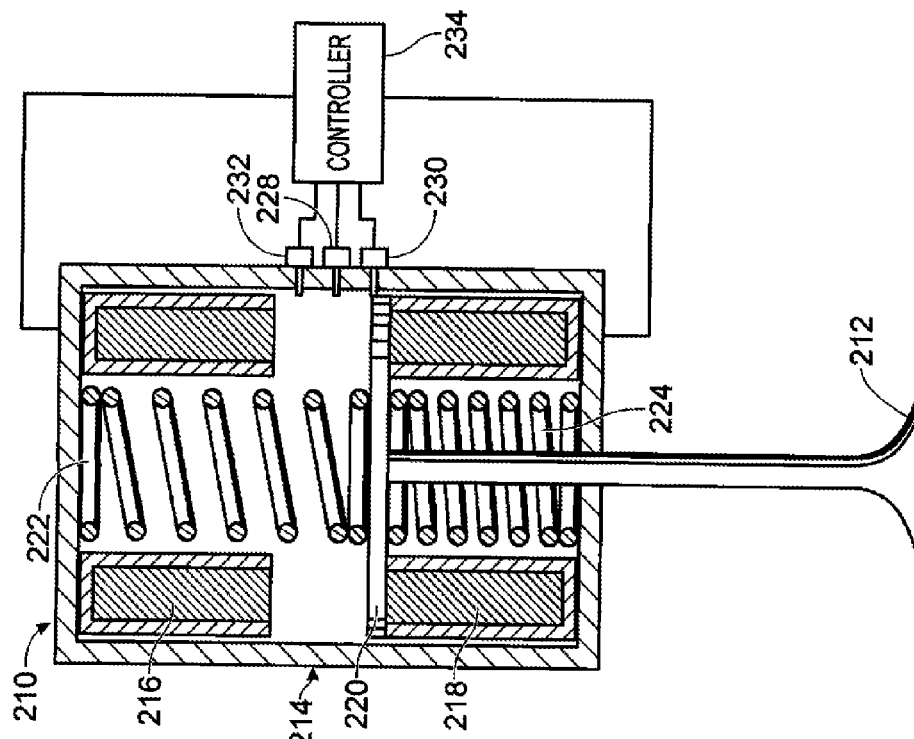
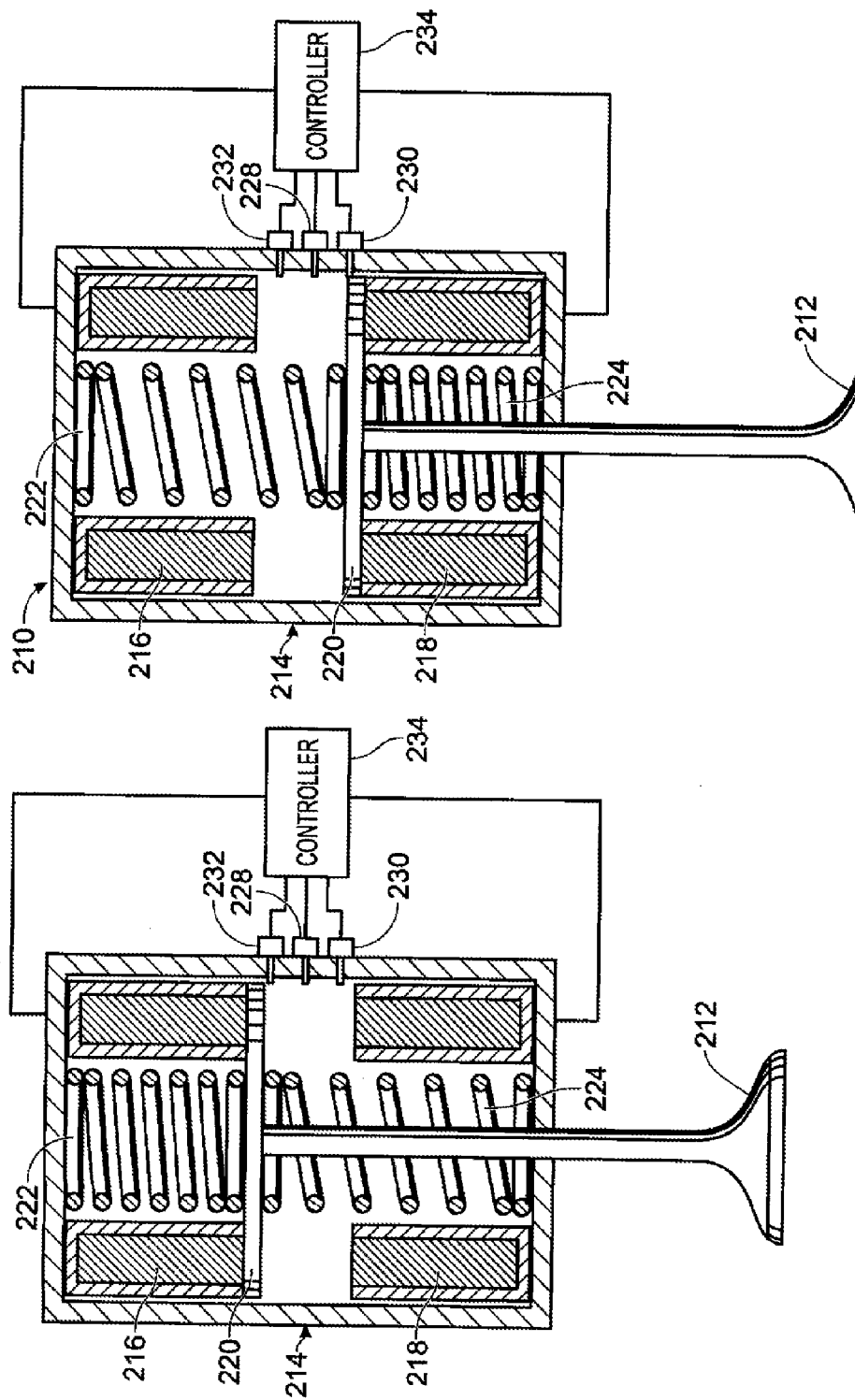
FIG. 2A
FIG. 2B

HCCI HEAVY MIXING MODE

FIELD

The present application relates to controlling emissions in an engine.

BACKGROUND AND SUMMARY

Vehicles having an internal combustion engine can operate in a variety of modes. As one example, an engine may operate in a spark ignition (SI) mode, wherein a charge of a mixture of air and fuel is ignited by a spark performed by a sparking device within a combustion chamber. As another example, an engine may operate in a compression ignition mode, wherein a mixture of air and fuel are compressed within a combustion chamber by a piston, causing ignition of the charge without necessarily requiring the addition of a spark from a sparking device.

One type of compression ignition known as homogeneous charge compression ignition (HCCI) utilizes compression of a substantially homogeneous mixture of air and fuel to achieve controlled auto-ignition (CAI). In HCCI engines, ignition occurs virtually simultaneously throughout a combustion chamber as a result of compression instead of spark ignition, making the combustion process challenging to control.

In one approach, described in SAE 2005-01-0762, a mixed SI and HCCI combustion mode is described in an 8-stroke cycle. Specifically, SI combustion may be used to increase charge exhaust temperature to assist in HCCI combustion on the next cycle. However, such operation may result in decreased efficiency due to the SI combustion event utilized with the HCCI combustion. The inventors herein have recognized the above-mentioned disadvantages and have developed a system that uses electronic valve actuation (EVA) and HCCI combustion in a multi-stroke mode by cycling a cylinder charge back into an intake to improve mixing of fuel and air charge for initiating or maintaining HCCI combustion.

One example approach to overcome at least some of the disadvantages of prior approaches includes operating a multi-stroke homogeneous charge compression ignition engine having a plurality of cylinders using electronic valve actuation, comprising: actuating at least one intake valve of a cylinder with a late intake valve opening (LIVO); receiving an air and fuel charge in the cylinder; opening the at least one intake valve during a compression stroke of a piston in the cylinder to cycle the air and fuel charge into an intake manifold to mix the air and fuel charge; opening the at least one intake valve to receive at least some of the mixed air and fuel charge from the intake manifold during an intake stroke; and compressing the mixed air and fuel charge to auto-ignition to generate HCCI combustion without applying spark ignition to the mixed air and fuel charge.

Operation according to various of the embodiments described herein may provide various advantages. In particular, by mixing an air and fuel charge and cycling it back into an intake passage, improved control of HCCI combustion and timing may be achieved in subsequent combustion, such as the next one to several, or more, combustions. Also, while such operation may assist in transitioning combustion modes, it may also be used to perpetuate HCCI combustion.

The above potential advantages and other advantages, and features will be readily apparent from the following Detailed Description and/or accompanying drawings.

DESCRIPTION OF THE DRAWINGS

FIGS. 2A and 2B are schematic diagrams of an example electric valve actuation system in a first position and a second position.

DETAILED DESCRIPTION

Figure 1:
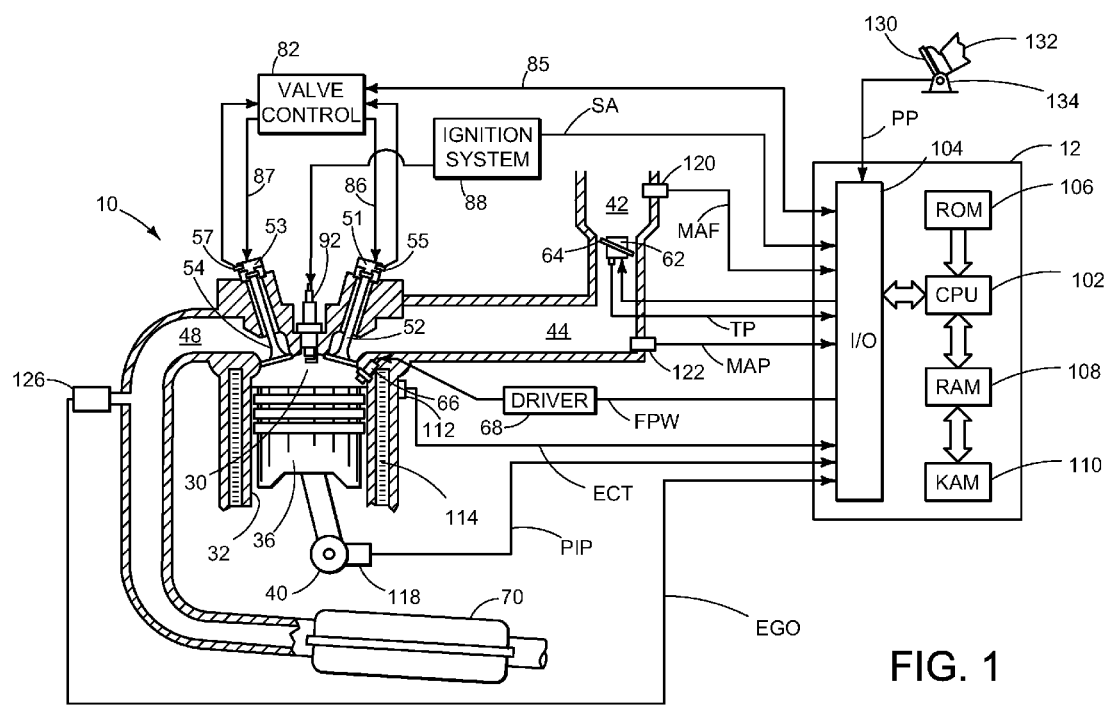
FIG. 1 is a schematic diagram of a portion of an example internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via valve controller 82 and electric valve actuator (EVA) 51. Valve controller 82, also called a slave controller or valve control unit (VCU), is shown coupled with controller 12 over link 85, but other embodiments may include more than 1 valve controller 82. In some embodiments link 85 is a high speed control area network (CAN) operating at 500 kbit/sec data bandwidth, but embodiments are not so limited and may operate at other speeds or may be other communication channels that adequately provide data transfer between controller 12 and one or more valve controllers 82. Valve controller 82 is in communication with electronic valve actuators 51 and 53 through links 86 and 87 and controls the opening and closing of the respective intake valve 52 and exhaust valve 54. Similarly, exhaust valve 54 may be controlled by controller 12 via valve controller 82 and EVA 53.

During some conditions, valve controller 82 may vary the signals provided to actuators 51 and 53 to control the opening and closing of the respective intake and exhaust valves. The position of intake valve 52 and exhaust valve 54 may be determined by valve position sensors 55 and 57, respectively.

In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example.

Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark or spark plug 92.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus.

Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa.

As described above, FIG. 1 shows only one cylinder of a multi-cylinder engine, and that each cylinder may similarly include its own set of intake/exhaust valves, fuel injector, spark plug, etc. Further, the engine may be coupled to a turbocharger and/or supercharger, such as to facilitate scavenged 2-stroke combustion cycles, at least under some operating conditions.

Figure 2C:
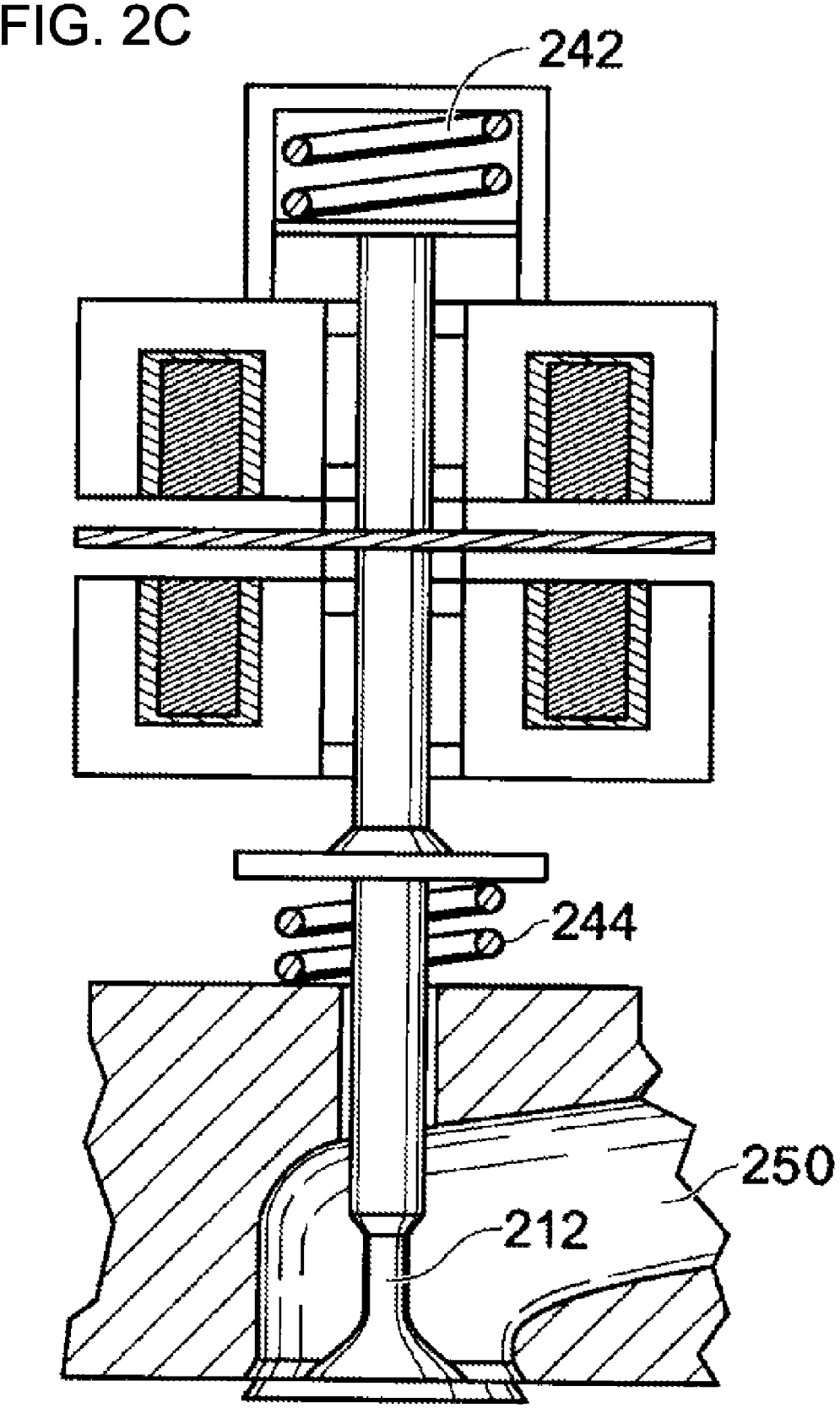
FIG. 2C is a schematic diagram of an example electric valve actuation system as further described in this disclosure.

FIGS. 2A, 2B, and 2C show a detailed view of an EVA system and valve that may be used as one of the intake or exhaust valves described above with reference to FIG. 1. Referring to FIGS. 2A and 2B, an EVA system 210 is shown for controlling movement of a valve 212 of a cylinder between a fully closed position (shown in FIG. 2A), and a fully open position (shown in FIG. 2B). The apparatus 210 includes an electric valve actuator (EVA) 214 with upper and lower coils 216 and 218 which electromagnetically drive an armature 220 against the force of upper and lower springs 222 and 224 for controlling movement of the valve 212.

One or more sensors 228, 230, and 232 may be provided for detecting a position, velocity and/or acceleration of armature 220. As one embodiment, at least one of sensors 228, 230, and 232 may include a switch type sensor that detects when armature 220 passes within a region of the sensor. In some embodiments, at least one of sensors 228, 230, and 232 may provide continuous position, velocity, and/or acceleration data to the control system for the armature and/or valve position.

Controller 234, which can be combined into controller 12, or act as a separate controller portion of the control system is shown operatively connected to position sensors 228, 230, and 232, and to the upper and lower coils 216 and 218 to control actuation and landing of valve 212. As described above, engine 10 has one or more electric valve actuators that may be used to vary the lift height, lift duration, and/or opening and closing timing in response to operating conditions of the engine.

FIG. 2C shows an alternative embodiment of an EVA system including a dual coil oscillating mass actuator with an engine valve actuated by a pair of opposing electromagnetic coils (e.g. solenoids), which are designed to overcome the force of a pair of opposing valve springs 242 and 244 arranged differently than the actuator of FIGS. 2A and 2B. Other components of the electric valve actuation system of FIG. 2C may be similar to those of FIGS. 2A and 2B, except that FIG. 2C shows port 250, which can be an intake or exhaust port of a cylinder of the engine. Applying a variable voltage to the coil of the electromagnet induces current to flow, which controls the force produced by each electromagnet. With some EVA systems, each electromagnet that makes up an actuator may be only able to produce a force in one direction, independent of the polarity of the current in its coil.

As illustrated above, the electrically actuated valves in the engine may remain in a half open position when the actuators are de-energized (e.g. no current is supplied). Therefore, prior to a combustion operation of the cylinder, each valve may go through an initialization cycle. During an initialization cycle, the actuators can be pulsed with current, in a prescribed manner, in order to establish the valves in the fully closed or fully open position. Further, as will be described below in greater detail, the initialization cycle may include a determination of a base level of holding current for one or more magnetic coils of the EVA system.

Following this initialization, the valves can be sequentially actuated according to the desired valve timing and firing order by the pair of electromagnetic coils, a first electromagnetic coil (e.g. the lower coil) for pulling the valve open and a second electromagnetic coil (e.g. the upper coil) for pulling the valve closed.

The magnetic properties of each electromagnet may be such that only a single electromagnetic coil (upper or lower) need be energized at any time. Since one of the coils (e.g. the upper coil) holds the valve closed for the majority of each engine cycle, it may be operated for a much higher percentage of time than that of the other coils (e.g. the lower coil).

Referring back to FIG. 1, engine 10 has cam-less independently variable intake and exhaust valves. This methodology could apply to any combination of variable intake and/or exhaust valve trains as well as EVA and mechanically driven valves. The valves are actuated using valve controller 82 where controller 12 may be the vehicle ECU and referred to as the master controller or master ECU.

As noted above herein, various combustion modes may be employed by one or more cylinders of the engine to improve performance. The combustion modes may include:
  spark ignition (SI) combustion, where a mixture of air and fuel is ignited via a spark. The air and fuel mixture may homogenous, stratified, or combinations thereof. Further, one or more cylinders of the engine may operate in a 2-stroke, 4-stroke, or other spark ignition combustion cycle, and may employ direct or port fuel injection, turbo-charging, super-charging, and various combinations there.
  homogenous charge compression ignition (HCCI), where a homogenous mixture of air and fuel is compressed to auto-ignition. Timing of auto-ignition may be adjusted by adjusted recycled exhaust gas, residual exhaust gas, exhaust temperature, etc., such as by varying valve timing, valve overlap between intake/exhaust valves, etc. Further, one or more cylinders of the engine may operate in a 2-stroke HCCI, 4-stroke, or other combustion cycle, an may employ direct or port fuel injection, turbo-charging, super-charging, and various combinations there.

During some operating conditions, such as selected speed load regions, or during select exhaust temperatures, HCCI combustion may be degraded. In one approach, a cylinder may be operated in a six-stroke cycle, where during the six strokes, both SI and HCCI combustion are used. For example, SI combustion may be initiated first to generate sufficient heat in the cylinder and exhaust to perform a subsequent HCCI combustion in the cycle. Thus, two power strokes may be achieved in the six-stroke cycle, and improved HCCI combustion may be achieved.

However, under some conditions, such operation may provide little to no advantage to 4-stroke SI combustion. As such, in another example, rather than utilize SI combustion in the cycle before HCCI combustion, a cylinder may be operated to pre-mix air and fuel in the cylinder to further heat the mixture and improve homogeneity. In one example, a cylinder may be operated to induce air and/or an air-fuel mixture, and then exhaust the air and/or air-fuel mixture back to the intake, before re-inducting an air-fuel mixture for HCCI combustion. Such operation may be referred to herein as pre-mixed HCCI combustion.

Figure 3A:
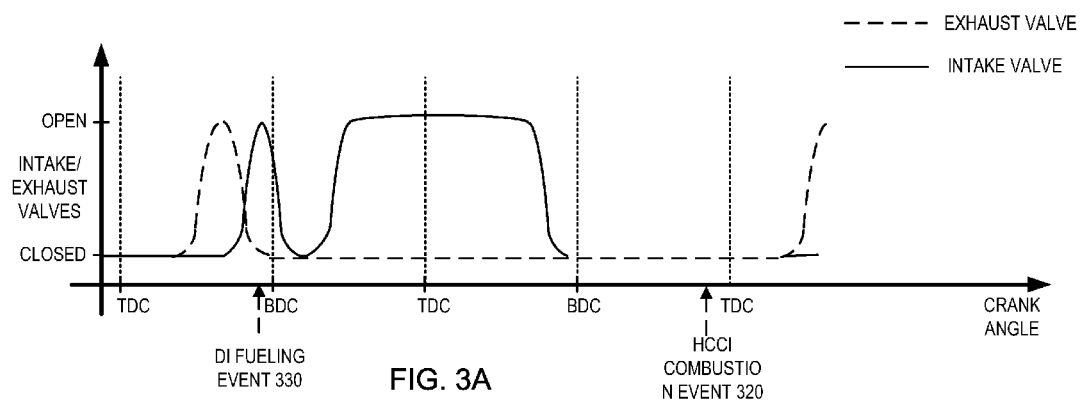
FIGS. 3A and 3B are example valve timing diagrams.
Figure 3B:
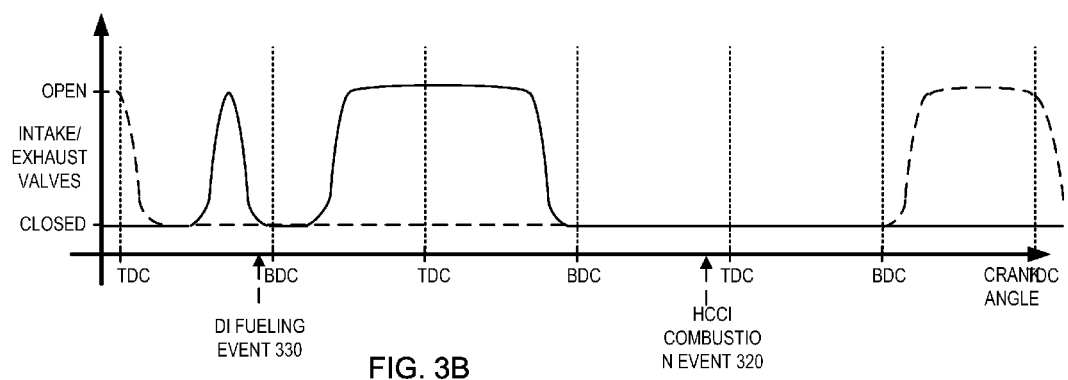

Examples of such operation are illustrated in FIG. 3A, showing an example where 4-strokes are used (e.g., two strokes for the pre-mixing, and 2-strokes for an HCCI combustion cycle). FIG. 3B also shows an example where 6-strokes are used (e.g., two strokes for the pre-mixing, and 4-strokes for an HCCI combustion cycle). The abscissa (x-axis) indicates crank angles of a first cylinder, including top dead center (TDC), followed by a bottom dead center (BDC), then a subsequent TDC, and so on to an arbitrary crank angle.

In one embodiment, a cylinder may be repeatedly operated with the pre-mixed HCCI combustion during selected operating conditions, such as a selected speed and/or load range. In another embodiment, a plurality of cylinders may be repeatedly operated with the pre-mixed HCCI combustion, whereas other cylinders may be operated with 4-stroke HCCI combustion (without pre-mixing), 4-stroke SI combustion, or another combustion mode or cycle. In still another embodiment, one or more cylinders may be intermittently operated with the pre-mixed HCCI combustion during selected operating conditions. In yet another embodiment, pre-mixed HCCI combustion may be used to transition one or more cylinders between SI and HCCI combustion. For example, a cylinder may transition from 4-stroke SI combustion, to a single cycle of pre-mixed HCCI operation, to 4-stroke HCCI operation (without pre-mixing), and vice versa.

In a further embodiment, a cylinder may operate in 4-stroke or 6-stroke pre-mixed HCCI combustion depending on operating conditions. Alternatively, one or more cylinders may operate in 4-stroke pre-mixed HCCI combustion whereas other cylinders operate in 6-stroke pre-mixed HCCI combustion.

The above example embodiments merely illustrate some of the many operating modes that may be used to provide one or more advantages. For example, the above operating modes may be used to improve HCCI combustion during select speed/load conditions, or may be used to improve transitions into and out of HCCI combustion. Further still, the may be used to achieve other operation and/or advantages.

Selection and/or adjustment of the above example operations may be based on various operating conditions. As noted, engine speed and/or load may be used in selecting a combustion mode, number of strokes, transitions, etc. For example, in one approach, the control system may vary combustion in one or more cylinders between 4-stroke pre-mixed HCCI and 4-stroke HCCI (without pre-mixing) based on example temperature, or based on predetermined patterns. Thus, one or more cylinders may operate with one pre-mixed HCCI combustion cycle every Y 4-stroke HCCI combustion cycles (without pre-mixing), where Y may be selected based on speed, exhaust temperature, and/or various other parameters.

Figure 4:
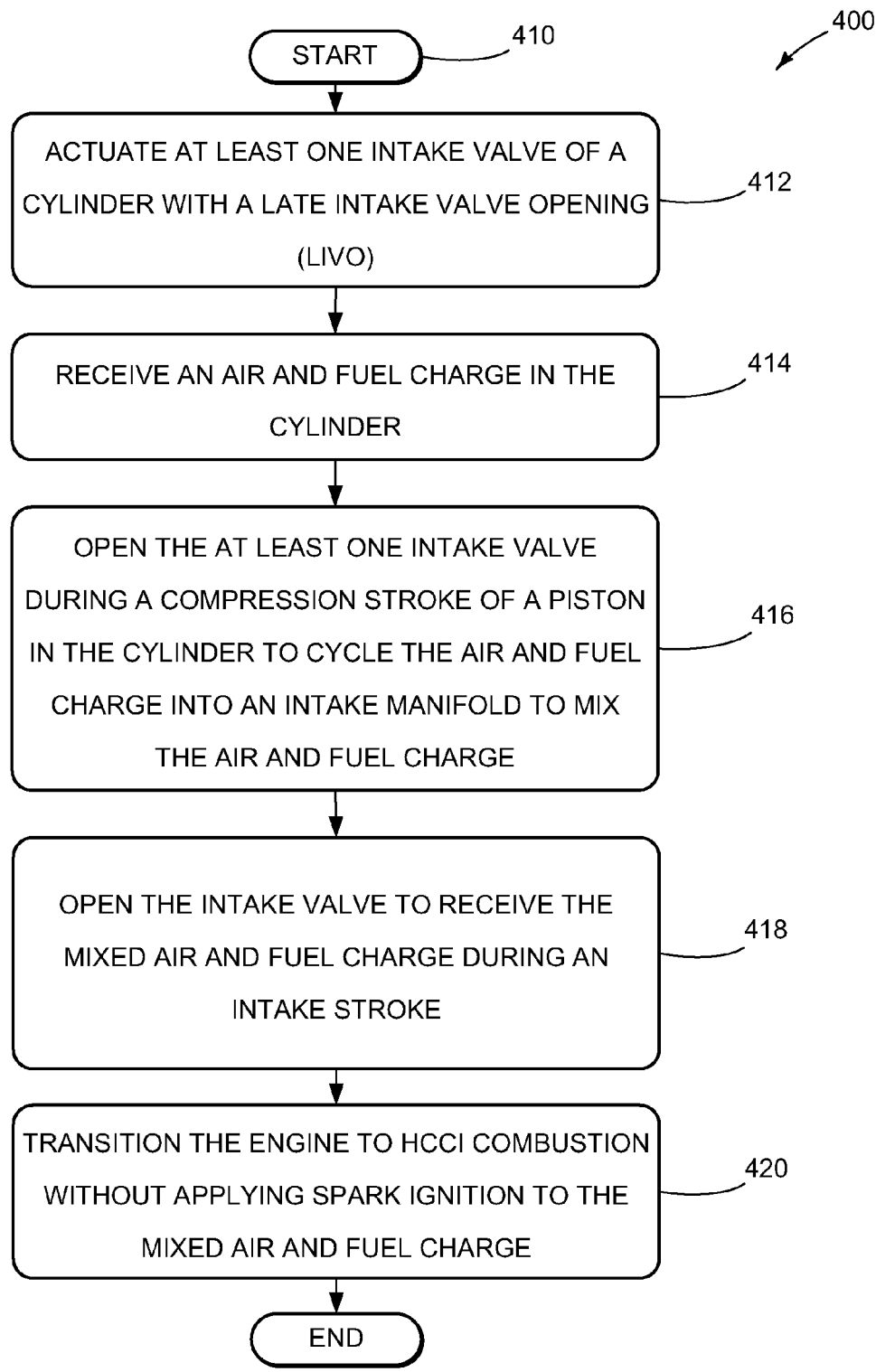
FIG. 4 is a flow diagram of an example method of operating a HCCI engine.

Alternatively, each cylinder may operate with 4-stroke HCCI combustion (without pre-mixing), and every Z HCCI cycle, the engine may perform X pre-mixed HCCI combustion cycles. In the example of a 4-cylinder engine, the engine may perform 4 consecutive combustion cycles of 4-stroke HCCI combustion, and every $5^{th}$ combustion cycle, a cylinder is operated with a 4-stroke pre-mixed HCCI combustion cycle. In this way, each cylinder operates in both modes, and each cylinder effectively operates with 4 HCCI combustions (without pre-mixing) to every 1 cycle with pre-mixing. Note that these is just examples, and various other values may be used for X, Y, and/or Z FIG. 4 is a flow diagram of an example method 400 of operating a cylinder with pre-mixed HCCI combustion. After method 400 begins in block 410, it actuates at least one intake valve of a cylinder with a late intake valve opening (LIVO) in block 412. A LIVO is used in method 400 to improve mixing of an air and fuel charge, however, other embodiments are not limited to a late intake valve opening and may use other intake valve timings.

In block 414, the method receives an air and fuel charge in the cylinder. Method 400 is in general directed to a port fuel injection (PFI), but another embodiment may intake an air charge and inject fuel with direct injection (DI) after an intake valve open event. Referring back to the embodiment illustrated in FIG. 4, in block 416 at least one intake valve is opened during a compression stroke of a piston to cycle the air and fuel charge into an intake passage or manifold to mix the air and fuel charge. In block 418, method 400 then opens an intake valve to receive the mixed air and fuel charge during an intake stroke, and then performs HCCI combustion without applying spark ignition to the mixed air and fuel charge. In another embodiment, method 400 may retain some of the mixed air and fuel charge in the intake manifold, and open the at least one intake valve to receive the mixed air and fuel charge from the intake manifold during the intake stroke following a first HCCI combustion. In yet another embodiment, method 400 may retain some of the mixed air and fuel charge in the intake manifold, and open the at least one intake valve to receive the mixed air and fuel charge from the intake manifold during the intake stroke following a second HCCI combustion.

For example, a cylinder may operate with a 4 or 6-stroke pre-mixed HCCI combustion cycle, and then the following 2 combustion cycles in that cylinder are performed with HCCI combustion (without pre-mixing), but using at least some of the previously pre-mixed charge still left in the intake manifold, or provided from other cylinders. In another example, a first cylinder may operate with a 4 or 6-stroke pre-mixed HCCI combustion cycle, and then the following consecutive combustion cycle (e.g., in a second cylinder that is the next cylinder to fire in the firing order) may perform HCCI combustion (without pre-mixing), but using at least some of the previously pre-mixed charge still left in the intake manifold from the first cylinder. Further, a third cylinder that is the next cylinder to fire following cylinder 2 may further utilize some of the previously pre-mixed charge still left in the intake manifold from the first cylinder.

Another embodiment may include a computer storage medium, such as ROM 106, RAM 108, KAM 110, etc., having instructions encoded therein for operating a homogeneous charge compression ignition engine having a plurality of cylinders using electronic valve actuation, to carry out method 400, or various of the other approaches and/or methods described herein.

Figure 5A:
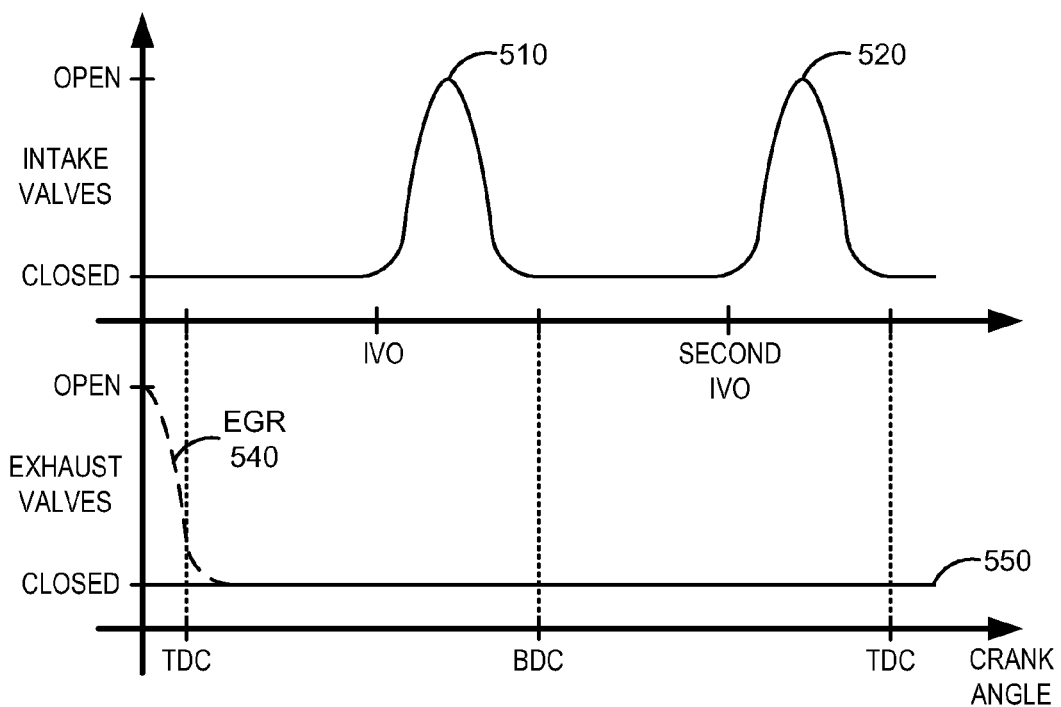
FIG. 5A is a valve timing diagram of an example method of operating a port fuel injected HCCI engine.

FIG. 5A is a valve timing diagram of an example method of operating a port fuel injected multi-stroke HCCI engine. The top portion of FIG. 5A illustrates an example intake valve timing while the bottom portion of FIG. 5A illustrates an example exhaust valve timing in accordance with one embodiment. The control system may adjust intake and exhaust valve timings according to HCCI mode combustion and operation conditions, such as to control auto-ignition timing, engine torque, etc.

According to one PFI embodiment, a fueling event may occur at some crank angle prior to IVO 510. The intake valve timing illustrates an opening at 510 and an opening at 520. This may be partial opening events and their timing may vary. According to the present embodiment, IVO event 510 occurs before BDC of a cylinder and draws an air and fuel charge into the cylinder. The cylinder cycles through BDC without an exhaust valve opening and then as it approaches TDC, another intake valve opening event 520 may occur. This second IVO opening at 520 occurs in an upstroke prior to TDC and mixes the air and fuel charge pumping it into the intake. According to a desired HCCI mode operation, the intake valve may be held open or may be closed at 520.

Accordingly, an embodiment may open an intake valve to receive the mixed air and fuel charge during an intake stroke, and then transition the engine to HCCI combustion without applying spark ignition to the mixed air and fuel charge. Another embodiment may retain some of the mixed air and fuel charge in the intake manifold, and open the at least one intake valve to receive the mixed air and fuel charge from the intake manifold during the intake stroke following a first HCCI combustion. Some embodiments may retain some of the mixed air and fuel charge in the intake manifold, and open the at least one intake valve to receive the mixed air and fuel charge from the intake manifold during the intake stroke following a second HCCI combustion.

Figure 5B:
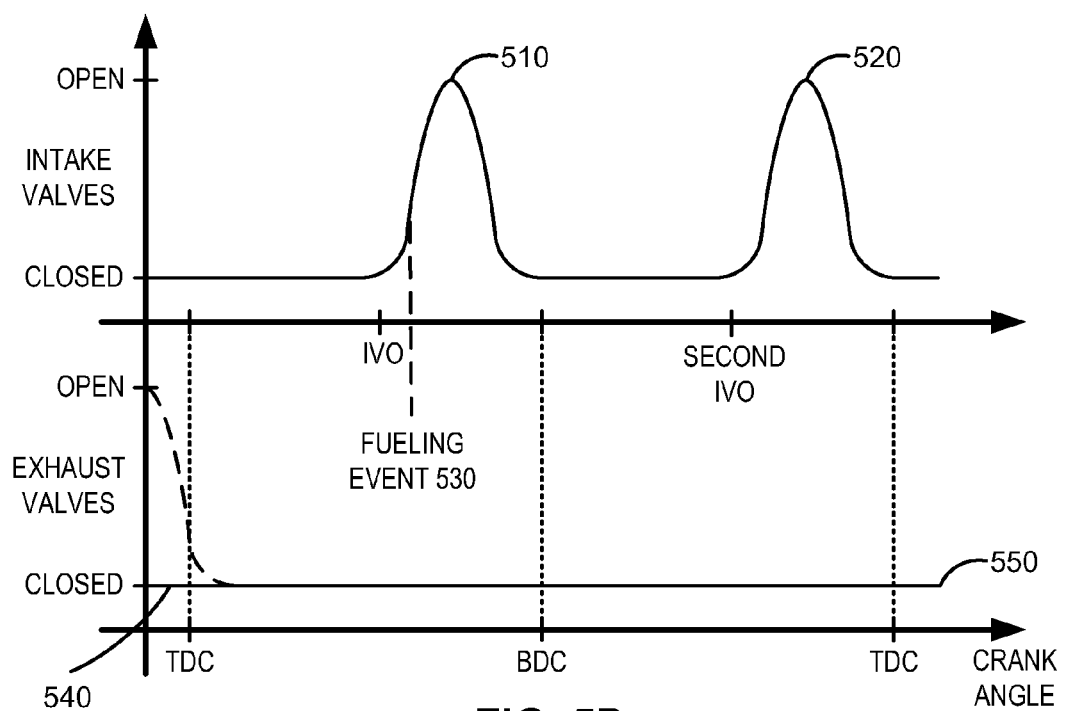
FIG. 5B is a valve timing diagram of an example method of operating a direct injected HCCI engine.

Some embodiments may adjust the exhaust valve timing according to an exhaust gas recirculation (EGR) strategy 540. In FIG. 5A, EGR strategy 540 is directed to opening an exhaust valve to recirculate exhaust gases into the first cylinder. In FIG. 5B, exhaust valves are illustrated as closed at the corresponding point 540. These aspects are for illustration purposes, and either EGR strategy, or other strategies, may be used in combination with a PFI embodiment as shown in FIG. 5A, or a DI embodiment as shown in FIG. 5B. FIG. 5B is a valve timing diagram of an example method of operating a direct injected multi-stroke HCCI engine. In particular, FIG. 5B illustrates a fueling event 530 occurring after the intake valve opening. In this manner, the intake of the air charge will mix with the fuel being directly injected and the second IVO event may mix the air and fuel charge by pushing it back into the intake in similar fashion as explained with reference to FIG. 5A.

Figure 6:
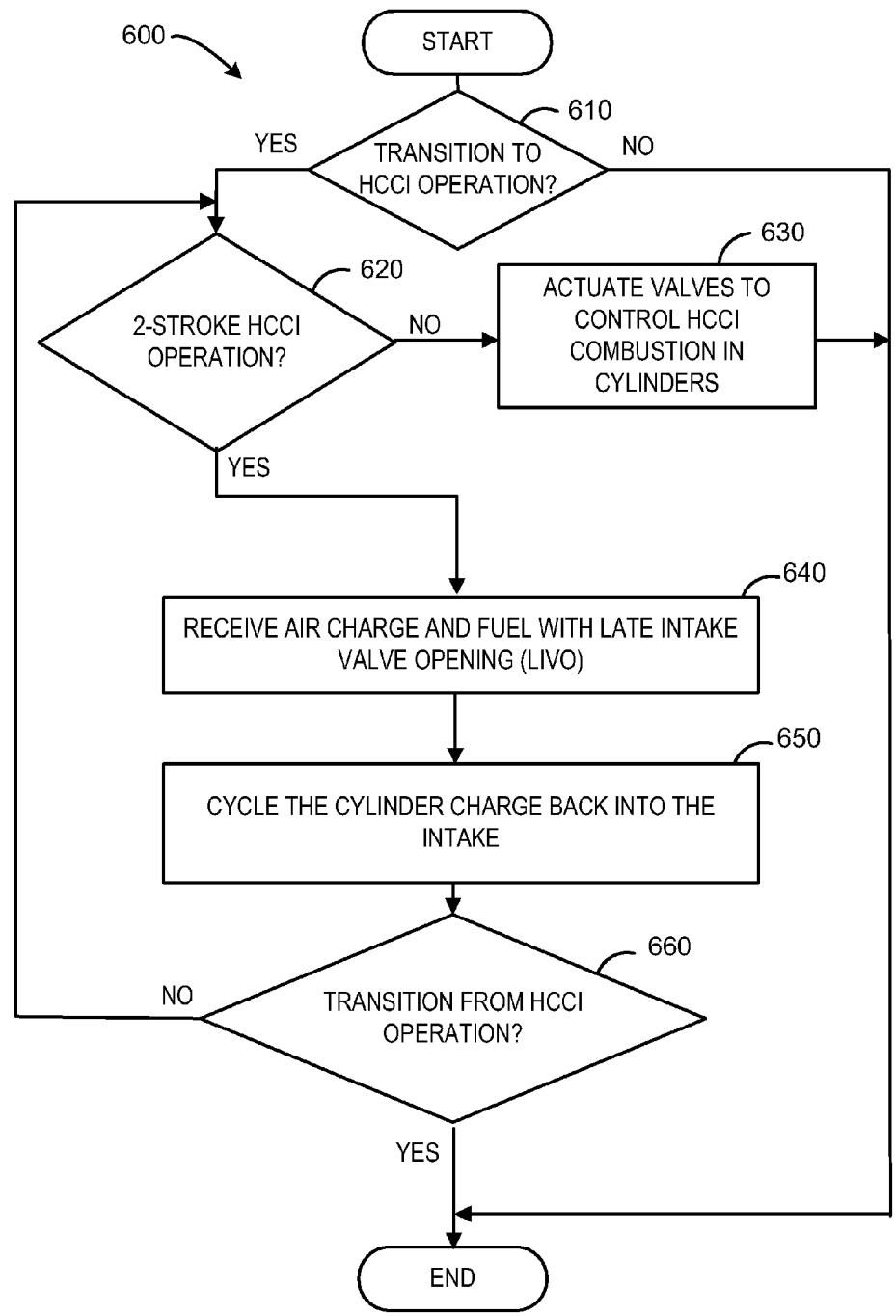
FIG. 6 is a flow diagram of a method of operating a HCCI engine during combustion mode transitions.

Referring now to FIG. 6, it shows a flow diagram of a method 600 of operating a HCCI engine using EVA and improved air and fuel charge mixing. Method 600 is directed at difficulties in initiating HCCI combustion, and in particular at alternatives to applying SI combustion events to initiate HCCI combustion in multi-stroke modes, as well as to improving transitions into HCCI combustion. While in this example pre-mixing in the cylinder and recycling mixed air and fuel to and from the intake manifold is used to improve transition in combustion modes, it is also applicable, if not more applicable, to other operating conditions as described herein.

In block 610 the method queries if an engine is transitioning to HCCI operation. If so, then in block 620 a query may be made if the engine is to operate with a 2-stroke and/or 4-stroke HCCI combustion with heavy pre-mixing (such as shown in FIGS. 3 and/or 5), and if not the method continues to actuate valves to control HCCI combustion in block 630 without pre-mixing (e.g., 4-stroke HCCI combustion without pre-mixing). As illustrated herein, while the combustion may include 2-stroke HCCI combustion, for example, the cycle may further include other events, such that a complete cycle, including pre-mixing, from one HCCI combustion to the next, may occur every four strokes, every six strokes, etc.

If it is determined at block 620 that the engine is transitioning to a mode including 2-stroke HCCI operation, then method 600 receives an air charge and fuel with a late intake valve opening (LIVO) in block 640. In an alternate embodiment, decision block 620 may be passed and the method can continue directly to block 640. In another embodiment, method 600 may intake an air charge and inject fuel with direct injection (DI) after an intake valve open event. Embodiment methods may be practiced with other intake events, but are not so limited as in block 640.

In block 650, an embodiment may then cycle a cylinder charge or a portion of the charge into an intake passage or intake manifold. By cycling the cylinder charge back into an intake, the charge may be mixed without extra or modified hardware such as piston bowl modifications or the addition of swirl valves. Additionally, if the charge is mixed adequately, then an embodiment may transition to a multi-stroke HCCI combustion without initiating the transition with a spark ignition. In block 660 a query is made if the engine is to transition from HCCI operation. If yes, the method may terminate until started again, or may loop back to block 610 (not shown).

If the result of the query in block 660 is that the engine is not transitioning from HCCI operation, the method 600 may loop back to block 620. Alternate embodiments may provide a similar heavy mixing mode that cycles a mixed air and fuel charge back into an intake passage or manifold without requiring a loop back to block 620. For example, a method may continue 2-stroke HCCI operation, or other multi-stroke HCCI operations, by firing the next 1 or more HCCI combustions using a portion of the mixed air and fuel charge that remained in the intake passage or manifold.

In this manner, method 600 may operate with multiple firing events (2-stroke operation with premixing), and instead of firing (SI) on a first combustion and HCCI on a 2nd or subsequent combustions in the cycle, the method can intake an air charge and fuel and cycle the cylinder charge back to the intake. This approach improves mixing of an air and fuel charge for HCCI combustion on at least the next 2 combustions. A direct injection (DI) approach may achieve a similar result by injecting fuel immediately after an intake valve opening event to allow early mixing in a cylinder and additional mixing using a second IVO well after bottom dead center (BDC) of the intake stroke. EVA allows these approaches due to an ability to have multiple intake valve actuations within the same cycle.

Another embodiment may include a multi-cylinder engine 10 having a plurality of cylinders with electronically actuated valves may operate a first portion of cylinders in a homogeneous charge compression ignition (HCCI) mode, and further include an engine controller 12 operably coupled to electronically actuated valves of the first portion of cylinders, wherein the engine controller 12 is configured to actuate at least one intake valve 52 of a cylinder with a late intake valve opening (LIVO), receive an air and fuel charge in the cylinder 30, open the at least one intake valve 52 during a compression stroke of a piston 36 in the cylinder 30 to cycle the air and fuel charge into an intake passage 44 (or manifold) to mix the air and fuel charge, open the at least one intake valve 52 to receive the mixed air and fuel charge from the intake passage 44 (manifold) during an intake stroke, wherein the engine 10 is transitioned to HCCI combustion without applying spark ignition to the mixed air and fuel charge.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for operating a multi-stroke homogeneous charge compression ignition engine having a plurality of cylinders using electronic valve actuation, comprising:
   actuating at least one intake valve of a cylinder with a late intake valve opening (LIVO);
   receiving an air and fuel charge in the cylinder;
   opening the at least one intake valve during a compression stroke of a piston in the cylinder to cycle the air and fuel charge into an intake manifold to mix the air and fuel charge;
   opening the at least one intake valve to receive at least some of the mixed air and fuel charge from the intake manifold during an intake stroke; and
   compressing the mixed air and fuel charge to auto-ignition to generate HCCI combustion without applying spark ignition to the mixed air and fuel charge.

2. The method of claim 1 wherein the engine is transitioned to HCCI combustion, and wherein the LIVO is late intake valve opening from a closed position, the opening timed late with respect to top dead center, and the opening further during a later portion of downward piston movement from top dead center to bottom dead center, but before bottom dead center, and wherein the opening during the compression stroke includes opening the at least one intake valve from closed between bottom dead center and top dead center and during upward piston movement.

3. The method of claim 2, wherein transitioning the engine to HCCI combustion comprises transitioning the engine to a two-stroke HCCI combustion cycle.

4. The method of claim 2, wherein transitioning the engine to HCCI combustion comprises transitioning the engine to a four-stroke HCCI combustion cycle.

5. The method of claim 1 further comprising receiving the fuel charge by direct injection after an intake valve opening event.

6. The method of claim 1, further comprising:
retaining some of the mixed air and fuel charge in the intake manifold; and
opening the at least one intake valve to receive the mixed air and fuel charge from the intake manifold during the intake stroke following a first HCCI combustion.

7. The method of claim 4, further comprising:
retaining some of the mixed air and fuel charge in the intake manifold; and
opening the at least one intake valve to receive the mixed air and fuel charge from the intake manifold during the intake stroke following a second HCCI combustion.

8. A method of operating a multi-cylinder engine with an intake and exhaust manifold, the engine having a cylinder with at least an intake and exhaust valve, the method comprising:
operating the cylinder of the engine with at least the following successive strokes:
a first stroke having downward piston motion where charge from the intake manifold is inducted into the cylinder and where the intake valve opens substantially after top dead center of the first stroke;
a second stroke having upward piston motion where the inducted charge is first compressed with both intake and exhaust valves held closed, and where the intake valve opens substantially after bottom dead center, but before top dead center of the second stroke to deliver at least some of the charge back to the intake manifold;
a third stroke having downward piston motion where at least some of the charge is re-inducted from the intake manifold with the intake valve remaining open from the second stroke and at least partially into the third stroke; and
a fourth stroke having upward piston motion where the re-inducted charge is compressed to auto-ignition with the intake and exhaust valves closed.

9. The method of claim 8 further comprising:
a fifth stroke having downward piston motion with the intake and exhaust valves closed; and
a sixth stroke having upward piston motion to exhaust the auto-ignited charge past the exhaust valve.

10. The method of claim 8 further comprising injecting fuel into a port upstream of the intake valve before said first stroke.

11. The method of claim 8 further comprising directly injecting fuel into the cylinder during said first stroke.

12. The method of claim 8 further comprising operating the cylinder with spark ignition in a cycle immediately before the first stroke, so that the cylinder transitions combustion to four-stroke HCCI combustion immediately after the fourth stroke.

13. The method of claim 9 further comprising operating the cylinder with spark ignition in a cycle immediately before the first stroke, so that the cylinder transitions combustion to four-stroke HCCI combustion immediately after the sixth stroke.

14. A computer storage medium having non-transitory instructions encoded therein for operating a multi-stroke homogeneous charge compression ignition engine having a plurality of cylinders using electronic valve actuation, said medium comprising:
code to actuate at least one intake valve of a cylinder with a late intake valve opening (LIVO);
code to receive an air and fuel charge in the cylinder;
code to open the at least one intake valve during a compression stroke of a piston in the cylinder, and to maintain the intake valve open during at least a later portion of the compression stroke to cycle the air and fuel charge into an intake manifold to mix the air and fuel charge;
code to maintain the at least one intake valve open from the compression stroke into an intake stroke to receive the mixed air and fuel charge from the intake manifold; and
code to transition the engine to HCCI combustion without applying spark ignition to the mixed air and fuel charge.

15. The medium of claim 14, wherein the HCCI combustion is a two-stroke HCCI combustion cycle.

16. The medium of claim 14, wherein if the engine is a direct injection engine, the medium comprising code to inject the fuel charge after an intake valve opening event.

17. The medium of claim 14, further comprising code to:
retain some of the mixed air and fuel charge in the intake manifold; and
open the at least one intake valve to receive the mixed air and fuel charge from the intake manifold during the intake stroke following a first HCCI combustion.

18. The medium of claim 15, further comprising code to:
retain some of the mixed air and fuel charge in the intake manifold; and
open the at least one intake valve to receive the mixed air and fuel charge from the intake manifold during the intake stroke following a second HCCI combustion.

* * * * *